United States Patent [19]

Brungardt

[11] Patent Number: 5,489,353
[45] Date of Patent: Feb. 6, 1996

[54] PROCESS FOR FORMING CERAMIC LAMINATES

[75] Inventor: Clement L. Brungardt, Oxford, Pa.

[73] Assignee: Lanxide Technology Company, LP, Newark, Del.

[21] Appl. No.: 168,902

[22] Filed: Dec. 16, 1993

Related U.S. Application Data

[63] Continuation of Ser. No. 830,106, Feb. 3, 1992, abandoned.

[51] Int. Cl.$^6$ .......................... B32B 31/04; B32B 31/26; B32B 31/20
[52] U.S. Cl. .............................. 156/89; 162/100; 264/56; 264/63
[58] Field of Search ................ 156/89; 264/63; 162/146, 181.5, 181.6, 181.8, 100

[56] References Cited

U.S. PATENT DOCUMENTS

| | | | |
|---|---|---|---|
| 3,510,394 | 5/1970 | Cadotte | 162/145 |
| 3,899,555 | 8/1975 | Takao et al. | |
| 3,919,446 | 11/1975 | Smazook | 264/41 |
| 3,962,389 | 6/1976 | Takase et al. | |
| 4,255,316 | 3/1981 | Blizzard | 260/37 SB |
| 4,366,202 | 12/1982 | Borovsky | 428/242 |
| 4,372,814 | 2/1983 | Johnstone et al. | 162/124 |
| 4,383,890 | 5/1983 | Oshima et al. | 162/181.8 |
| 4,421,599 | 12/1983 | Kuzuoka et al. | 162/100 |
| 4,451,539 | 5/1984 | Vallee | 428/515 |
| 4,487,657 | 12/1984 | Gomez | 162/158 |
| 4,488,969 | 12/1984 | Hou | 210/679 |
| 4,510,019 | 4/1985 | Bartelloni | 162/141 |
| 4,517,069 | 5/1985 | Harney | 204/290 |
| 4,521,355 | 6/1985 | Kitajima et al. | 264/60 |
| 4,529,662 | 7/1985 | Lancaster et al. | 428/450 |
| 4,578,150 | 3/1986 | Hou | 162/164.3 |
| 4,608,361 | 8/1986 | Kanamori et al. | 502/232 |
| 4,609,431 | 9/1986 | Grose et al. | 162/135 |
| 4,645,565 | 2/1987 | Vallee et al. | 162/145 |
| 4,718,926 | 1/1988 | Nakamoto et al. | 55/523 |
| 4,769,274 | 9/1988 | Tellvik | 428/218 |
| 4,806,206 | 2/1989 | Kamijo et al. | 162/145 |
| 4,891,174 | 1/1990 | Seki | 264/44 |
| 4,929,308 | 5/1990 | Gerault et al. | |
| 4,943,349 | 7/1990 | Gomez | 162/158 |
| 5,009,822 | 4/1991 | Sacks et al. | 264/23 |
| 5,041,248 | 8/1991 | Renlund | 264/44 |
| 5,127,158 | 5/1992 | Nakano | 162/145 |

FOREIGN PATENT DOCUMENTS

| | | | |
|---|---|---|---|
| 60-30075 | 2/1985 | Japan . | |
| 61-168582 | 5/1986 | Japan . | |
| 61-239100 | 10/1986 | Japan . | |
| 62-207778 | 9/1987 | Japan . | |
| 0030075 | 1/1988 | Japan | 264/63 |
| 3021106 | 1/1988 | Japan | 264/63 |

*Primary Examiner*—David A. Simmons
*Assistant Examiner*—M. Curtis Mayes
*Attorney, Agent, or Firm*—Carol A. Lewis

[57] ABSTRACT

A ceramic forming paper sheet is prepared by dispersing in water a ceramic-forming powder, a thermoplastic pulp and wood pulp, flocculating the dispersion by adding a cationic wet strength resin and an anionic polymer, dewatering the flocculated dispersion to form a sheet, and wet pressing and drying the sheet. The sheets can be stacked, and pressed or thermoformed, followed by firing to consolidate the sheets to a ceramic.

7 Claims, No Drawings

PROCESS FOR FORMING CERAMIC LAMINATES

This is a continuation of application Ser No. 07/830,106 filed on Feb. 3, 1992, now abandoned.

FIELD OF THE INVENTION

This invention relates to the preparation of ceramic laminates through the use of thermoplastic synthetic pulps. This invention especially relates to a method of forming highly porous ceramics from a mixture of wood pulp, thermoplastic pulp, and ceramic-forming powder.

BACKGROUND OF THE INVENTION

In general, the traditional methods used to shape ceramics, such as slip-casting, tape-casting and hot-pressing, are slow and labor-intensive, and the green bodies that are formed by these methods are often fragile and difficult to handle. Although papermaking methods have been proposed for shaping ceramic powders, e.g., U.S. Pat. Nos. 3,510,394; 3,899,555; 4,421,599; 4,521,355 and 4,525,662, these methods have several disadvantages relevant to the present invention. These prior art products cannot be fired to highly porous ceramics and the range of shapes is limited to the most simple geometric shapes.

SUMMARY OF THE INVENTION

A method has now been found for producing highly porous ceramics from easy to handle green bodies. The green bodies can be prepared in a variety of complex shapes and fired into a porous ceramic, through the use of thermoplastic pulp in preparing the green bodies. The process of this invention for forming highly porous ceramics comprises (a) dispersing in water a thermoplastic pulp and wood pulp, (b) adding a ceramic-forming powder to said dispersion, (c) flocculating the dispersion by adding a cationic wet strength resin and an anionic polymer, (d) dewatering the flocculated dispersion to form a sheet, and (e) wet pressing and drying the sheet. The sheets then can either be stacked and thermoformed as a single sheet or pressed or thermoformed into a variety of shapes by conventional techniques followed by firing to produce a ceramic.

DETAILED DESCRIPTION OF THE INVENTION

The first step of the process according to this invention is the formation of a highly filled sheet containing ceramic-forming powder, thermoplastic pulp, and wood pulp through use of conventional paper making machines.

Any type of ceramic-forming powder can be used in the process of this invention, e.g., clays, oxide ceramics and non-oxide ceramics. The preferred ceramic-forming powders include kaolin, feldspar, talc, $Al_2O_3$, $Al_2TiO_5$, $ZrO_2$, $Si_3N_4$, SiC and AlN. More preferred ceramic-forming powders in the practice of the present invention include kaolin, feldspar, talc, $Al_2O_3$, $ZrO_2$, and AlN. The preferred ceramic-forming powder is $Al_2O_3$. Although the ceramic materials are referred to as "powders" herein, it should be understood that these materials can also be added in the form of whiskers and platelets.

The type and amount of thermoplastic pulp used depends upon the desired end use of the product. The amount used depends, in particular, upon the degree of porosity desired in the end product. The amount of fibers can vary from 5–70% by volume, preferably in the range of from 30–50% and most preferably about 40%. The thermoplastic pulp can be any non-woven thermoplastic fiber such as, polyethylene pulp (Pulpex®EA manufactured by Hercules Incorporated), polypropylene synthetic pulp, polyester, nylon and polyacrylonitriles such as orlon. The choice of the type of fiber and fiber morphology is determined primarily by the desired porosity, pore size distribution and pore morphology of the final product. Large diameter long fibers are necessary where a large pore size is required and conversely, when small pore size is required, a small diameter short fiber is necessary. If the product is to be used as a filter, enough organic material must be added to form a continuous network of pores after said organic material is burned out, typically 35–40% by volume of organic filler. It has been found that this level of organic filler cannot be added with conventional organic fillers, such as sawdust or crushed walnut shells, without the sheet disintegrating upon firing. However, up to about 5% by volume of such conventional organic fillers can optionally be added to the compositions of the present invention without adverse effect.

The wood pulp is added to allow for ease of handling and to provide for sheet strength on the paper making machine. The amount of wood pulp added is determined by the amount of thermoplastic fiber, so that the total amount of wood pulp plus thermoplastic fiber is at the required level to give the desired porosity to the fired sheet. Less wood pulp is needed to form a strong sheet if a high percentage of synthetic pulp is added. At least one percent wood pulp must be added, preferably 5–15%, with about 10% being the most preferred. Hardwood pulp is preferred over softwood pulp because hardwood pulp generally produces finer flocs than softwood pulp as well as a better formed sheet.

After the thermoplastic fiber, ceramic-forming powder and wood pulp are dispersed in water, the dispersion is flocced by adding a cationic wet strength resin and an anionic polymer. Examples of suitable cationic wet strength resins include KYMENE® 2064, KYMENE® 557H, KYMENE® 367, KYMENE® 450 and KYMENE® 460 amine-epichlorohydrin resins, which are commercially available from Hercules Incorporated. The cationic resins provide wet strength during sheet formation, particularly when using a continuous papermaking process. Suitable anionic polymer flocculating agents include, but are not limited to, RETEN® 1523 and RETEN® 235 polyacrylamide resins, both of which are commercially available from Hercules Incorporated, and carboxymethyl cellulose. The order of addition of the cationic and anionic polymers is not critical, although the cationic polymer is generally added first.

The flocculated dispersion is dewatered to form a sheet in which the fibers and ceramic-forming powder are uniformly dispersed, and the sheet is wet pressed and then dried and consolidated. If at least 40% thermoplastic fiber has been added to the dispersion, the sheets can be stacked and molded into a variety of shapes by conventional thermoforming techniques. After lamination or thermoforming, the structure can be fired to a ceramic using standard methods. When forming laminates, the composition of the sheets used to form the layers can be the same or different.

The present invention allows for the preparation of such sheets without additional coating or impregnating steps. Significantly higher levels of fillers can be incorporated into the sheets without disintegration occurring upon firing than when conventional fillers are used.

Once pressed and formed, the sheet or sheets can be fired to laminates, corrugated structures, tubes, and honeycombed structures that can be used as heat exchangers, filters, multilayer capacitors and catalyst supports, using any standard ceramic method.

Comparative Example

In this comparative example, paper sheets were prepared from the mixtures of wood pulp, walnut shell flour, and alumina in the table below in accordance with the method in Example 1.

| % Wood Pulp | % Alumina | % Walnut Shell Flour |
|---|---|---|
| 10 | 90 | 0 |
| 10 | 85 | 5 |
| 10 | 80 | 10 |
| 10 | 75 | 15 |

The samples prepared with walnut shell flour yielded well consolidated ceramics upon firing. However, the samples prepared with 10% and 15% walnut shell flour disintegrated to powder upon firing, demonstrating that a much lower percentage of walnut shell flour, a conventional ingredient in paper, could be added and still produce a well consolidated ceramic than the level of thermoplastic pulp typically added in the practice of the present invention. The conventional fillers cannot be added in the amounts needed to create the desired porosity sheets for the end uses of the products of this invention.

EXAMPLE 1

In Example 1, an alumina/synthetic polyethylene pulp sheet was prepared. A dispersion was prepared by mixing 61.4 g of Pulpex®EA synthetic polyethylene pulp (Hercules, 39% solids in water) and 640 g of hardwood pulp (2.5% solids, C.S.F. 250 ml) in a blender. The dispersion was transferred to a proportionator along with 155.8 g of an A-16 alumina dispersion (Alcoa, 77% solids). The dispersion was then diluted to 16 liters. After transfer of a 2 liter portion of this dispersion to a glass jar and a second dilution to a 3 liter jar, the dispersion was flocced by first adding 5 ml of an aqueous KYMENE® 2064 amine-epichlorohydrin resin solution (4.5% solids) followed by 125 g of an aqueous solution of RETEN® 235 polyacrylamide resin (0.125% solids). The polyacrylamide resin was typically added until the supernatant became clear and a cottony floc was formed. An 8"×8" handsheet was formed from the flocced dispersion on a Noble and Wood handsheet machine. A 100 mesh stainless steel screen was used to form the sheet. The sheet was then wet pressed and dried. Five additional handsheets were formed from the dispersion using the above method. Calculations based on the weight of the dried sheet showed that retention of the alumina in the sheet was greater than 95%.

EXAMPLE 2

In Example 2, a laminate of the alumina/synthetic polyethylene pulp sheets of Example 1 was prepared. A six layer stack of alumina sheets was placed between two metal plates that had been coated with a release agent. Shims of 1/16" were also placed between the metal plates to control the thickness of the laminate. The assembly was then placed in a heated Carver Laboratory Press (130° C.). After allowing the temperature of the sample to equilibrate for two minutes, the sample was pressed at 5,500 psi for one minute. The metal plates were then allowed to cool to room temperature and the laminate was removed.

EXAMPLE 3

In Example 3, the laminate prepared in Example 2 was fired according to the following schedule:

5° C./hour, 100° C.–600° C.

60° C./hour, 600° C.–1600° C.

Hold at 1600° C. for two hours

Cool to room temperature

EXAMPLE 4

In Example 4, paper sheets were prepared from the following mixture using the method described in Example 1:

10% Hardwood Pulp

25% Pulpex®EA polyethylene pulp

65% A-152 Alumina (Alcoa)

Six layers of the paper sheets were then stacked and pressed into a laminate as described in Example 2. The pressed laminate was then fired in accordance with the firing schedule listed in Example 3. The fired laminate had a density of 1.68 g/cc.

EXAMPLE 5

In Example 5, paper sheets were prepared from the following mixture using the method described in Example 1:

10% Hardwood Pulp

30% Pulpex®EA polyethylene pulp

60% A-152 Alumina (Alcoa)

Six layers of the paper were then stacked and pressed into a laminate as described in Example 2. The pressed laminate was then fired using the schedule listed in Example 3. The fired laminate had a density of 1.44 g/cc.

EXAMPLE 6

In Example 6, paper sheets were prepared from the mixtures of wood pulp, Pulpex®EA polyethylene pulp and A-152 alumina in the table below in accordance with the method outlined in Example 1. Samples of the paper sheets were then fired to 1000° C. in a muffle furnace. All five samples yielded well consolidated ceramics.

| % Wood Pulp | % Pulpex ®EA* | % Alumina |
|---|---|---|
| 10 | 20 | 70 |
| 10 | 25 | 65 |
| 10 | 30 | 60 |
| 10 | 35 | 55 |
| 10 | 40 | 50 |

*Polyethylene pulp

EXAMPLE 7

In Example 7, paper sheets were prepared from the mixtures of wood pulp, Pulpex®PSFG polypropylene pulp and A-152 alumina in the table below in accordance with the method outlined in Example 1. Laminates were then prepared by pressing a six layer stack of the paper to 160° C. using the procedure described in Example 2. The laminates were then fired to 1000° C. in a muffle furnace. All five samples gave well consolidated ceramics.

| % Wood Pulp | % Pulpex ®PSFG* | % Alumina |
|---|---|---|
| 10 | 5 | 85 |

-continued

| % Wood Pulp | % Pulpex ®PSFG* | % Alumina |
| --- | --- | --- |
| 10 | 10 | 80 |
| 10 | 15 | 75 |
| 10 | 20 | 70 |

*Polypropylene pulp

EXAMPLE 8

In Example 8, a corrugated sheet formation was made using the formulation in the table below. Four sheets of paper were made in accordance with the procedure of Example 1. The sheets of paper were stacked in a corrugated-shaped mold and then pressed at 150° C. using the method described in Example 2. The paper softened and conformed to the corrugated shape of the mold. A well consolidated ceramic was formed by firing the corrugated laminate to 1000° C. in a muffle furnace.

| % Wood Pulp | % Pulpex ®EA | % Alumina |
| --- | --- | --- |
| 10 | 40 | 50 |

I claim:

1. A process for forming a shaped ceramic sheet comprising firing a ceramic-forming paper to consolidate said paper to a ceramic having essentially the same shape as the unfired body and having a porosity of greater than 20 volume percent, said ceramic-forming paper comprising a mixture of a non-fibrous, ceramic forming powder, wood pulp and at least 35% by volume of a thermoplastic fiber filler.

2. The process of claim 1 wherein said non-fibrous, ceramic-forming powder is selected from the group consisting of kaolin, feldspar, talc, $Al_2O_3$, $Al_2TiO_5$, $ZrO_2$, $Si_3N_4$, SiC, AlN and mixtures thereof.

3. The process of claim 2 wherein said non-fibrous, ceramic-forming powder is selected from the group consisting of kaolin, feldspar, talc, $Al_2O_3$, $ZrO_2$, AlN and mixtures thereof.

4. The process of claim 3 wherein said non-fibrous, ceramic-forming powder is $Al_2O_3$.

5. The process of claim 1 wherein said thermoplastic fiber is selected from the group consisting of polyethylene pulp and polypropylene synthetic pulp, and mixtures thereof.

6. The process of claim 1 wherein at least about 40% by volume of said paper sheet is said thermoplastic pulp filler.

7. A process for preparing a shaped ceramic body comprising stacking a multiplicity of layers of a ceramic-forming paper to form a laminate, pressing the laminate with concurrent application of heat to form a molded object, and then firing said pressed laminate to consolidate said layers of ceramic-forming paper to a ceramic having essentially the same shape as the unfired body and having a porosity of greater than 20 volume precent, said paper comprising a mixture of a non-fibrous, ceramic-forming powder, wood pulp and at least 40% by volume of a themoplastic pulp filler.

* * * * *